United States Patent [19]

Dunlop

[11] 4,373,200
[45] Feb. 8, 1983

[54] TURNTABLE MOUNTINGS FOR RECORD PLAYERS

[75] Inventor: Peter B. Dunlop, Troon, Scotland

[73] Assignee: Aristoscot Designs Limited, Troon, Scotland

[21] Appl. No.: 112,295

[22] Filed: Jan. 15, 1980

[30] Foreign Application Priority Data

Jan. 18, 1979 [GB] United Kingdom ............... 7901804
Jun. 7, 1979 [GB] United Kingdom ............... 7919861

[51] Int. Cl.³ ........................................... G11B 19/20
[52] U.S. Cl. ................................................ 369/263
[58] Field of Search .................... 369/263, 269, 266

[56] References Cited

U.S. PATENT DOCUMENTS

| | | | |
|---|---|---|---|
| 2,237,907 | 4/1941 | Landis | 369/266 |
| 2,247,651 | 7/1941 | Carson | 369/263 |
| 2,927,795 | 3/1960 | Drake | 369/263 |
| 3,025,066 | 3/1962 | Siebert | 369/263 |
| 3,300,222 | 1/1967 | Scott | 369/263 |
| 3,510,137 | 5/1970 | Freier | 369/263 |
| 4,071,252 | 1/1978 | Gillespie | 369/269 |
| 4,202,551 | 5/1980 | Darnall | 369/263 |

*Primary Examiner*—Charles E. Phillips

[57] ABSTRACT

A turntable mounting for a record player comprises a platform for rotatably supporting a turntable. The turntable has three angularly spaced holes, and the shanks of bolts pass freely through the holes and are secured into sockets in the base. Compression springs on the bolts extend between the platform and nuts on the bolts, so that the platform is resiliently supported. During assembly, the nuts are adjusted to provide the desired tension in the springs and are set so as to turn with the bolts if the latter are adjusted to effect levelling of the platform. In this way, the setting of the nuts and thus the tension in the springs is not altered. Should the tension in a spring require to be altered, the nut can be held by a spanner while the bolt is turned.

7 Claims, 4 Drawing Figures

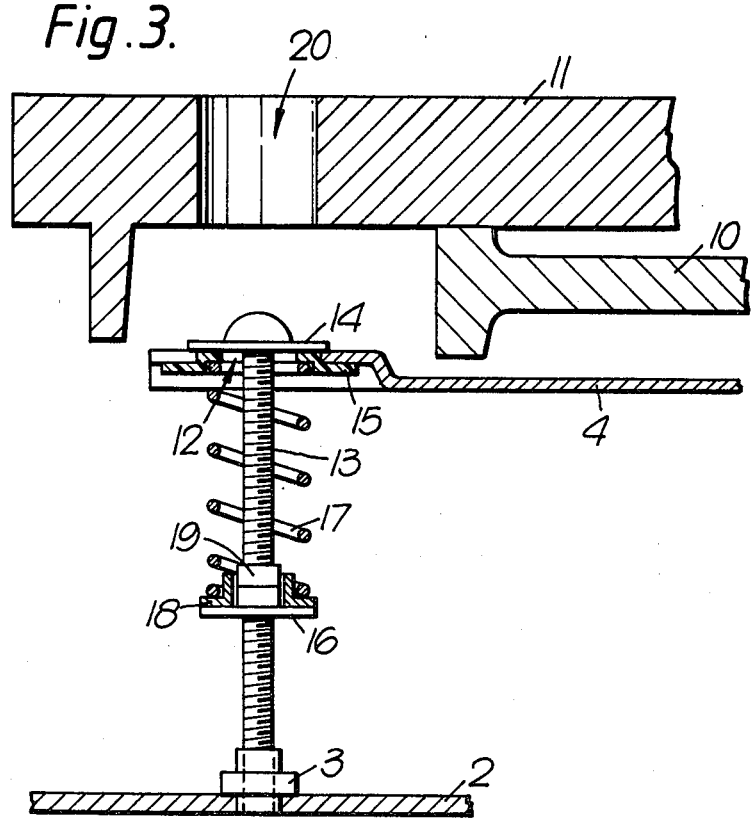
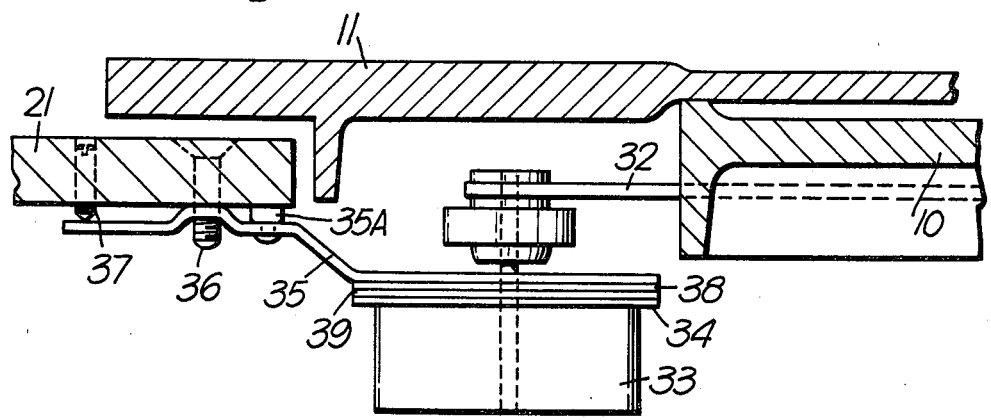

TURNTABLE MOUNTINGS FOR RECORD PLAYERS

This invention relates to apparatus for mounting a turntable on a record player carcass.

Turntables include a platter on which the record is laid and which is usually mounted on a sprung framework or chassis so that movement of the platter in response to external vibrations may be deadened. The pick-up arm is also usually mounted on the sprung chassis so that undesired movements between the record and the stylus are minimised. In addition, the attitude of the platter relative to the turntable plinth or framework can be set by adjusting the tensions of springs to set and maintain it horizontal in order to provide optimum record playing conditions. In known methods of so setting the platter, adjustment to the platter carrier chassis or sprung framework is made by adjusting the nut at the lower end of the support springs which are assembled on and about screw-threaded bolts fixed at the upper end to and supported by the plinth or turntable cabinet.

This arrangement for adjustment has the following disadvantages:

(1) Adjustment of the nuts varies the spring tension as aforesaid, and consequently alters the turntable performance characteristics;
(2) Adjustment is usually only possible after removing a portion of the plinth;
(3) Adjustment is usually only possible after disconnecting from the power supply;
(4) Adjustment is usually a time consuming, potentially damaging, and tedious operation because of the weighty and bouncy configuration of transcription turntable and the the sensitive and fragile make-up of transcription arms and cartridges; and
(5) Each spring support washer and adjustment nut is located at the loose end of the support bolts and is a potential source of resonance.

An object of the present invention is to provide:

(a) apparatus for mounting a turntable on a record player carcass by which the disadvantages aforesaid may be obviated or mitigated, and undesired vibrations may be reduced or eliminated.
(b) a consistent adjustment configuration providing primary and secondary adjustment of the support mechanism, and
(c) an advanced transcription turntable for improved stable signal reproduction within the available range of transcription tone arms and cartridges.

According to the present invention there is provided a record player carcass having apparatus for mounting a turntable therein, said apparatus comprising a platform for rotatably supporting a turntable, a plurality of holes in said platform, a corresponding plurality of upstanding bolts whose shanks pass freely through said holes respectively and are screwed into the base of the carcass, a nut on each bolt, and a resilient member on each bolt and extending substantially between each nut and the platform, said resilient members supporting the platform, the heads of the bolts limiting upward movement of the platform, the nuts being set on the bolts to provide the required tension in the resilient members and turning with the bolts when the latter are turned to level the platform, whereby the tension in the resilient members remains unaltered when the bolts are turned.

The turntable platter may be provided with at least one hole, through which a screwdriver can be inserted for adjustment of the bolts.

The said platform may be designed to carry also a record player arm assembly. In this event, the tension in the resilient means nearer the arm assembly may, dependent upon the weight of the arm assembly, be greater than the tension in the resilient means remote from said assembly, in order to compensate for the eccentric loading caused by the assembly.

Preferably, there are only three of said bolts, and three of said holes in the platform, the holes being angularly equi-spaced.

Preferably also, said resilient means comprises coil springs through which the bolts pass.

An embodiment of the invention will now be described, by way of example, with reference to the accompanying diagrammatic drawings, in which:

FIG. 3 is a sectional detail view on the line III—III of FIG. 1 to a larger scale; and FIG. 4 is a sectional view on the line IV—IV of FIG. 1 to a larger scale.

Figure 2:
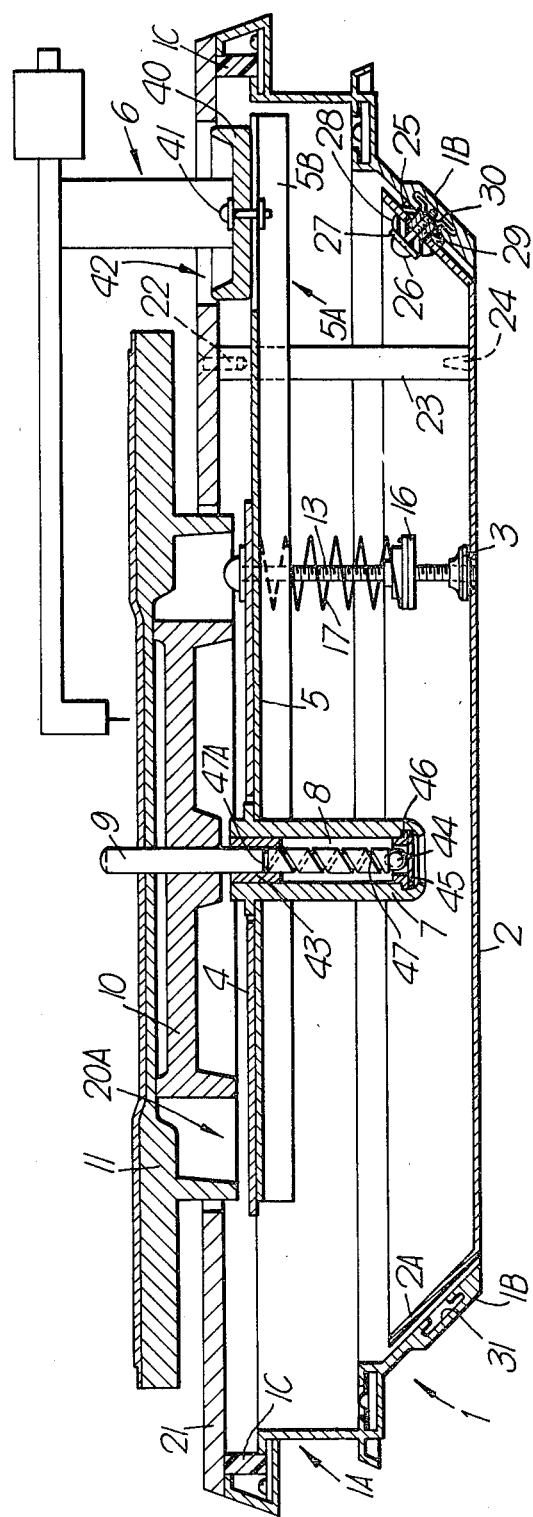
FIG. 2 is a fragmentary sectional view to a larger scale on the line II—II of FIG. 1.

Referring to the drawings, a record player carcass 1 consists of a rectangular or square frame 1A closed at the bottom by a base 2. The base 2 has fixed thereto three angularly spaced threaded socket members or nuts 3 (FIGS. 2 and 3). A generally circular platform 4 is secured on a channel section member 5 which extends diametrically of the platform 4 and has a radially projecting extension 5A, the member 5 having downwardly projecting flanges 5B. The extension 5A carries a record player arm assembly 6 (FIG. 2), and the member 5 has secured thereto centrally of the platform 4 a downwardly projecting boss or housing 7 having a bore 8 into which the spindle 9 of a sub-platter 10 projects. A turntable platter 11 rests on the sub-platter 10.

The platform 4 is supported on the base 2, as follows. The platform 4 has three angularly spaced throughholes 12 through which the shanks of three screwthreaded bolts 13 pass freely and are screwed respectively into the nuts or sockets 3 in the base 2. A metal washer 14 is secured to the head of each bolt and abuts a stepped nylon washer 15 which engages below the platform 4. Each bolt 13 has a nut 16, and a compression spring 17 surrounding the shank. At its lower end, each spring abuts a nylon washer 18 on the nut 16, and at its upper end abuts the washer 15, so that the platform 4 is resiliently supported by the springs 17, and the heads of the bolts limit upward movement of the platform 4. The nuts 16 are set during assembly to provide the required tension in the springs 17, and each is secured in position by a nut 19 having a lower serrated face engaging each nut 16. The nuts 16 are set to accommodate platters and arm assemblies of different weights or of a mean weight thereof.

From the above, it will be seen that, if one or more of the bolts 13 are turned to effect levelling of the platform 4 and the turntable 11, the tension in the spring on the adjusted bolt or bolts is not altered, because the nuts 16 and 19 turn with the bolt or bolts. The base 2 of the carcass has height adjustable feet (preferably three feet) not shown.

In order to facilitate access to the bolts 13 by a screwdriver, the turntable 11, especially when it is not easily removable, is provided with at least one through-hole 20, FIG. 3, through which a screw-driver can be inserted for turning of the bolts. Preferably, there are three such holes 20 angularly equi-spaced about the centre of the turntable.

If the platter 11 and/or the arm assembly is changed for ones of different weights, this may cause some difference in the tensions in the springs, but this can be compensated by adjustment of the bolts 12 relative to the base, to level the platform.

Should it at any time be necessary to adjust the tension in any of the springs 17, this can be effected by holding the appropriate nut 16 with a spanner and by turning the corresponding bolt. For this purpose, a spanner (not shown) is provided which is of generally Z formation so that it can be inserted, after removal of the turntable 11, through the space between the outer edge of the platform 4 and the periphery of a circular aperture 20A in a top closure plate 21. The latter is secured on top of the frame 1A by bolts 22 screwed into the upper ends of four pillars 23 which are secured to the base 2 by bolts 24. For the sake of clarity, only one pillar 23 (FIG. 2) is shown in the drawings.

The base 2 of the carcass may be made of a different material from the frame 1A to provide acoustic damping conditions. For example, the base 2 may be made of steel and the frame 1A may be made of extruded aluminium.

Further acoustic damping may be effected as follows. As shown in FIG. 2, the frame 1A has a lower portion 1B which forms a downwardly and inwardly inclined flange, and the base 2 has an upwardly and outwardly correspondingly inclined flange 2A which overlaps the flange 1B. A plurality of rubber washers 25 is located between the flanges 2A, 1B, and the flanges are secured together by bolts 26 which pass through the washers 25 and holes in the flanges 2A. Each bolt 26 also passes through a metal washer 27, and there is a rubber washer 28 between the washer 27 and the flange 2A. The bolt 26 is located in the hole in the flange 2A by a nylon bush 29, and the bolt is screwed into a fastener 30 located in a channel 31 in the flange 1B. The remaining space between the flanges may be filled by strips of acoustic damping tape, not shown.

Figure 1:
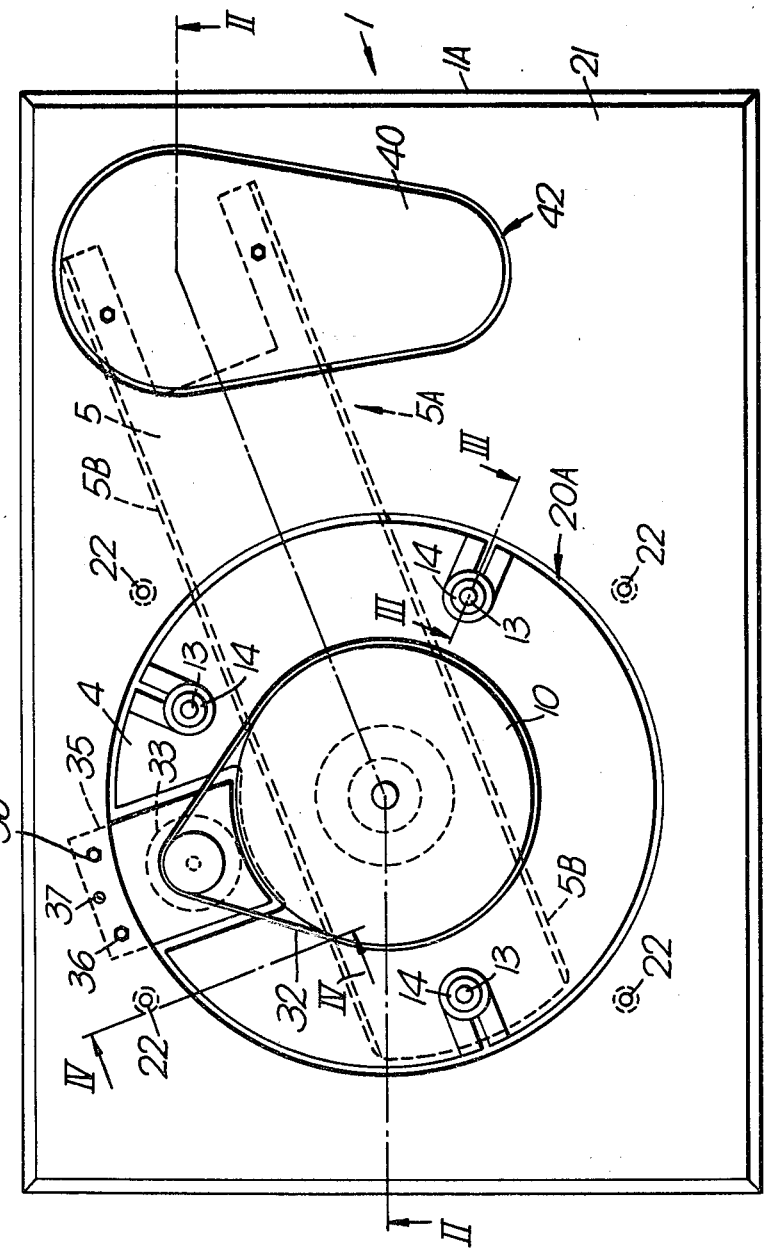
FIG. 1 is a plan view of a record player carcass having apparatus for mounting a turntable according to the present invention.

When the arm assembly 6 is mounted on the extension 5A, two of the three bolts 13 with the springs 17 are located, as shown in FIG. 1, nearer the arm assembly than the other bolt and spring to compensate for the weight of the assembly, and the tension in said two springs may be greater than in said other spring.

Instead of the springs 16, it is possible that rubber columns or sleeves may be used, and fluid units may also be used.

The sub-platter 10 is driven by a belt 32 from a motor 33, and the mounting of the motor will now be described with reference to FIG. 4.

The motor 33 has a flange 34 which is secured by nuts and bolts (not shown) to one end portion of a bracket 35. The other end portion of the bracket 35 is located below the closure plate 21 and is secured thereto by two bolts 36 (FIGS. 1 and 4). On the side of the bolts 36 remote from the motor 33, a set-screw 37 passes through a tapped hole in the closure plate 21 into engagement with the tail end of the bracket 35. To the side of the bolts 36 nearer the motor, the bracket 35 carries a rubber stud 35A on which the closure plate 21 rests.

Thus, if the platform 4 is adjusted to effect levelling, the bracket 35 can be correspondingly adjusted by means of the bolts 36 and re-setting of the set-screw 37, so that the belt 32 is correctly aligned, and the rotary axes of the motor and the sub-platter 10 remain parallel. Between the flange 34 and the bracket 35, there is an aluminium plate 38 and a layer of soft-touch plastics material 39 bonded to the plate 38. This enhances the reproducability of the acoustic signals, as does the fact that the closure plate 21 is made of dense fibre board, and rests adjacent its edges on rubber liners 1C extending along the side of the frame 1A. The arm assembly 6 rests on a dish 40 (FIGS. 1 and 2), also made of dense fibre board, and is secured to the extension 5A of the member 5 by two screws 41 which pass through the dish 40. The dish 40 is located in a correspondingly shaped aperture 42 in the closure plate 21.

As a result of the foregoing, the turntable platter can be quickly and easily levelled, when necessary, in order to provide optimum contact between the stylus and the record tracks to improve the quality of sound reproduction. Moreover, because the bolts 13 are anchored at their lower ends in the sockets 3, and the lower end of the springs are located near the anchored ends of the screws, the possibility of undesired vibrations which can reduce the quality of the hi-fidelity signal is reduced or eliminated. The possibility of such vibrations is also reduced by virtue of the above described manner of mounting the base 2 of the chassis on its frame 1A.

There may be any convenient number of bolts 13 and associated parts, but in order to prevent imbalanced rotation of the platter 11, there should be more than one hole 20 angularly equi-spaced about the centre of the platter.

The mounting of the sub-platter 10 will now be described in more detail with reference to FIG. 2.

The spindle 9 projects into the cylindrical housing 7 and is located at the upper end of the housing 7 by a bush 43. The lower end face of the spindle 9 has a cavity of which the peripheral edge bears on a ball bearing 44. The ball 44 bears on a disc 45 made of p.t.f.e., and located at the base of the housing 7. The ball 44 is located within a bush 46 but does not rest on the bush.

The shaft 9 is provided with a capillary groove 47 which extends around the shaft in the form of a slow-pitch helix from the lower end of the shaft and terminates in a horizontal peripheral or keeper groove 47A at a point within the depth of the bush 43.

The lower end of the housing 7 contains a supply of oil, and, when the spindle 9 rotates, oil is fed upwards by the helical groove providing a constant supply to the keeper groove 47A within the bush 43, resulting in an oil cushion between the bush and the spindle, so that the oil takes up substantially all tolerances.

As a result of the above described mounting of the turntable, it has been found that there is a substantial improvement in sound reproduction, in such areas known as bass extension, separation, and general clarity, and speed inconsistency which can arise due to the design of prior turntable mountings, is eliminated or greatly reduced.

The spindle 9 and the ball 44 are preferably made of stainless steel. In an alternative arrangement (not shown), the ball 44 bears on an annular seat made of p.t.f.e., said seat resting on the base of the housing 7.

I claim:

1. Phonographic apparatus comprising a carcass, a rotatable platter having a rotational axis, a motor drivingly coupled to the platter, a pickup arm assembly having a mounting point, and a platform mounting the platter, the platform being resiliently mounted in the carcass; in which said platform extends along a line between the rotational axis of the platter and the mounting point of the pickup assembly, and the pickup assembly is mounted on one end of said platform; where the motor is mounted to the carcass by adjustable mounting means which are adjustable to position the motor in both height and attitude with respect to the platter and where said mounting means comprises a bracket which carries said motor at one end and which is secured at its other end to the underface of a closure plate detachably secured to the top of the carcass, the bracket being secured to the closure plate by means of two bolts, said mounting means further including a set-screw positioned to one side of the bolts and passing through the closure plate into engagement with the bracket, and a resilient stud positioned to the other side of the bolts and located between the bracket and the closure plate, said bolts and set-screw being adjustable to set said motor at the correct height and attitude in relation to said platform.

2. Apparatus according to claim 1, in which said platform is secured to said carcass via three resilient assemblies, two of said assemblies being disposed symmetrically on opposite sides of said line and between the rotational axis of the platter and the pickup assembly, and the other of said assemblies being positioned on said line on the opposite side of said platter.

3. Apparatus according to claim 1, in which each resilient assembly is secured to the base of the carcass and is adjustable from above.

4. Apparatus as claimed in claim 1, in which said motor has a flange bolted to said bracket, an aluminum plate having a sheet of soft-touch plastics material bonded thereto being interposed between said flange and said bracket with said plastics sheet facing said flange.

5. Apparatus as claimed in claim 1, including a sub-platter and a mounting therefor, said mounting comprising a cylindrical housing located centrally of said platform, a spindle passing through the sub-platter and projecting into said housing, a bush between the spindle and the housing at the upper end of the latter, a disc made of plastics material at the bottom of said housing, a ball bearing resting on said disc and supporting said spindle, a cavity in the bottom face of the spindle whose peripheral edge engages the ball, and a capillary groove extending helically around the spindle and terminating at its upper end in a keeper groove located at a level within the depth of the bush, the groove in use, feeding oil upwards to between the spindle and the bush.

6. Apparatus according to claim 1, in which the carcass comprises a rectangular frame closed at the bottom by a base, the frame and the base having mutually opposed inclined flanges at each side, and the opposed flanges being secured together by bolts which pass through resilient washers located respectively between the heads of the bolts and the flanges of the base, and between the opposed flanges.

7. Apparatus as claimed in claim 6, in which the carcass has a top closure plate made of dense fibre board, said closure plate resting adjacent its side edges on rubber runners extending along each side of the frame of the chassis, and the closure plate being secured by screws to the upper ends of a plurality of pillars connected to the base of the chassis.

* * * * *